Figure 1:
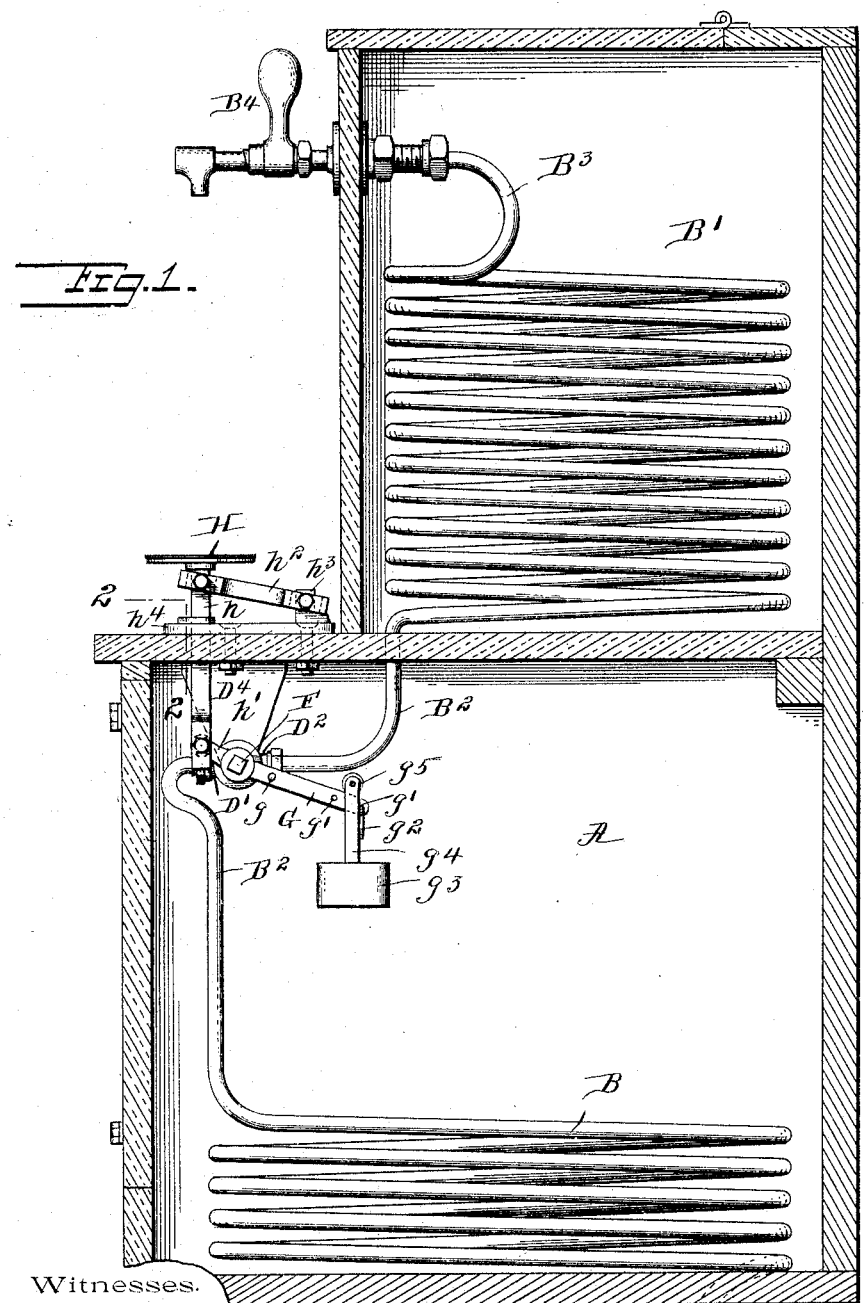

No. 632,773. Patented Sept. 12, 1899.
A. T. WILKINS & D. DEVER.
AUTOMATIC WEIGHING AND CUT-OFF APPARATUS.
(Application filed June 24, 1899.)

(No Model.) 2 Sheets—Sheet 1.

Witnesses. Inventors
Jesse B. Miller, Alfred T. Wilkins and
J. M. Shindler Jr. Daniel Dever
by Harding and Harding
Attorneys.

THE NORRIS PETERS CO., PHOTO-LITHO., WASHINGTON, D. C.

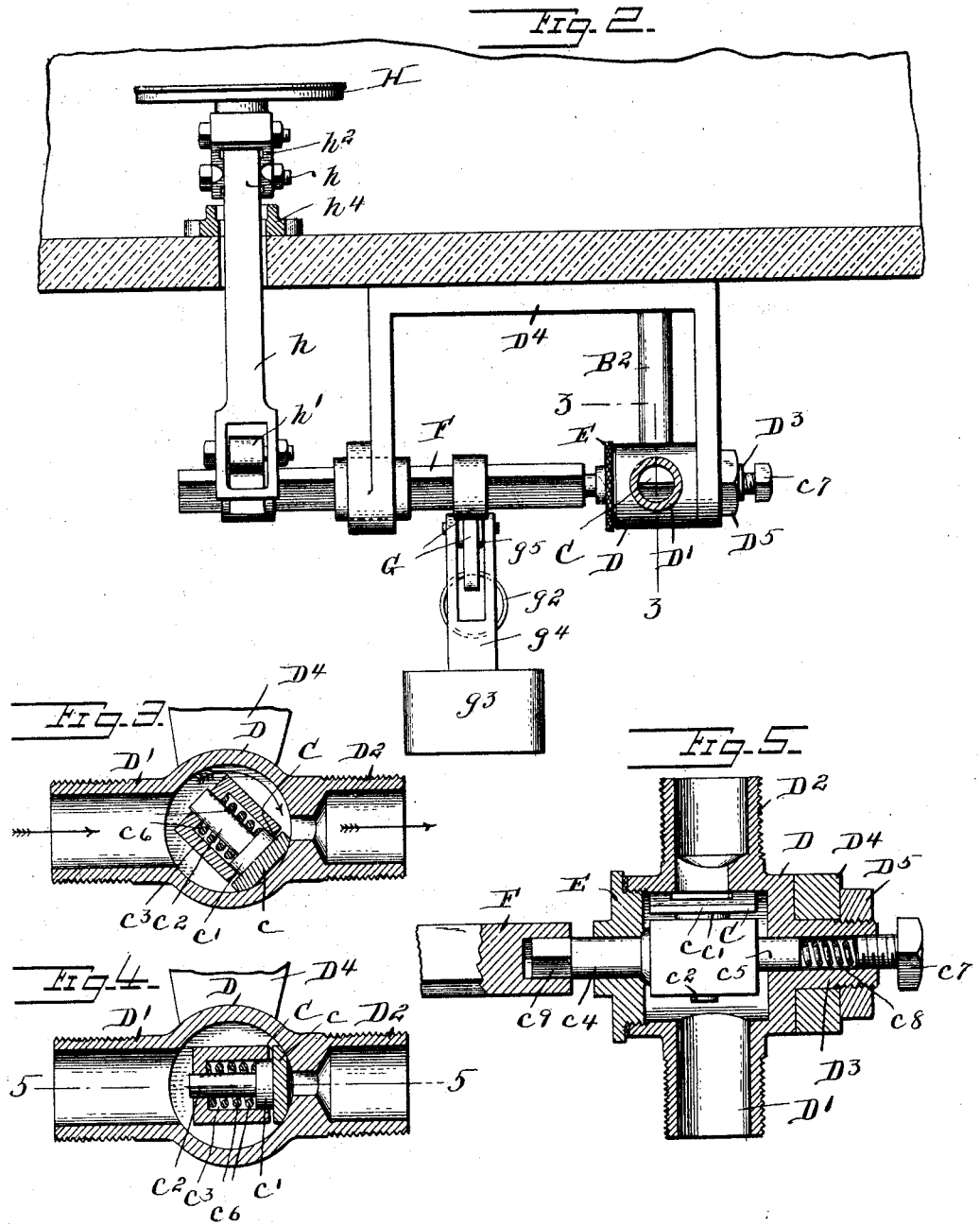

UNITED STATES PATENT OFFICE.

ALFRED T. WILKINS AND DANIEL DEVER, OF PHILADELPHIA, PENNSYLVANIA.

AUTOMATIC WEIGHING AND CUT-OFF APPARATUS.

SPECIFICATION forming part of Letters Patent No. 632,773, dated September 12, 1899.

Application filed June 24, 1899. Serial No. 721,682. (No model.)

*To all whom it may concern:*

Be it known that we, ALFRED T. WILKINS and DANIEL DEVER, citizens of the United States, residing at Philadelphia, county of Philadelphia, and State of Pennsylvania, have invented a new and useful Improvement in Automatic Weighing and Cut-Off Apparatus, of which the following is a full, clear, and exact description, reference being had to the accompanying drawings, which form a part of this specification.

Our invention relates to an automatic weighing and cut-off apparatus for beer and other liquids, and has for its object the provision of means for drawing off liquid from a supply-reservoir and automatically shutting off the flow after a predetermined quantity has been delivered to the vessel provided for the reception of the liquid; also, the provision of an automatically-operated valve for cutting off the supply which shall be independent of the manually-controlled spigot or faucet and which shall be normally open to admit liquid thereto; also, the provision of a special form of valve adapted to the special purpose of the invention; also, to provide a scale specially adapted to the control of the independent cut-off valve.

The invention consists in the arrangement of the valve independently of the spigot or faucet, in the means for controlling the valve, in a slidable weight for quickly shutting off the valve, in the arrangement of mechanism with reference to the ice-chests for cooling the beer or other liquid preparatory to withdrawing the same, in the details of construction of the special valve, and in various details of construction of the weighing and valve-operating mechanism.

In the drawings, Figure 1 is an elevation of the ice-chests, shown in section, beer-coils, spigot, weighing and cut-off mechanism, and connections. Fig. 2 is a side elevation of the weighing and cut-off mechanism and the valve. Fig. 3 is a section on the line 3 3, Fig. 2, the valve being shown in its open position. Fig. 4 is a view similar to Fig. 3, the valve being shown in its closed position. Fig. 5 is a section on the line 5 5, Fig. 4.

A is the lower ice-chest; B, the coil of pipe in the lower ice-chest, adapted to be connected with a source of supply; B', the coil of pipe in the upper ice-chest; $B^2$, a pipe connecting the lower coil with the upper coil; $B^3$, a pipe leading to the spigot; $B^4$, the spigot, which is of the usual construction.

Interposed in the pipe connection $B^2$ is a valve-casing containing the rotatable valve C. The valve-casing is formed in two parts D E. The part D incloses the valve at the side and at one end and has the screw-threaded openings $D'$ $D^2$ at opposite sides, adapted to be connected, respectively, with the section of pipe $B^2$, leading from the coil B, and the section of pipe $B^2$, leading to the coil B, the opening $D^2$ being constricted and adapted to be closed by the valve C. The end wall of part D of the valve-casing has an annular flange $D^3$, which is supported from bracket $D^4$ and is screw-threaded at its outer end to receive the nut $D^5$. The part E forms the other end wall of the valve-casing and has a screw-thread on its periphery engaging a screw-thread on the inner end of part D. The rotatable valve consists of the member $c$, having the shoulder $c'$ and stem $c^2$, the upper end of which has a bearing in the inclosure $c^3$, which is secured at the ends to the valve-stems $c^4$ $c^5$. A coiled spring $c^6$ surrounds the stem $c^2$ and keeps the valve member $c$ in close-fitting contact with the circular wall of the valve-casing. The valve-stem $c^5$ extends within the end wall of the member D of the valve-casing. Engaging the annular flange $D^3$ is the bolt $c^7$, and between the bolt $c^7$ and valve-stem $c^5$, within the annular flange $D^3$, is a coiled spring $c^8$. By means of this bolt and spring the pressure of the valve against the wall E of the valve-casing can be accurately regulated so as to maintain a tight joint at that point. The valve-stem $c^4$ extends through end wall E and has a square head $c^9$, which engages the end of the square shaft F, supported in bearings in the other arm of the bracket $D^4$.

The scale consists of a platform upheld by a sliding weight and the particular mechanism constituting the same and its connection with the shart F.

G is a lever tight on the shaft F, having a stop $g$ near its inner end and orifices $g'$ toward its outer end, either of which is adapted to receive the removable ring $g^2$.

$g^3$ is a weight having a bifurcated supporting-bar $g^4$, carrying at its top the roller $g^5$, which is adapted to slide upon the top surface of the lever G. The weight normally holds the lever G in the position indicated in Figs. 1 and 3, the bar $g^4$ engaging the ring $g^2$.

Projecting down through the top of the lower ice-chest is a post $h$, carrying at its upper end the platform H, and pivoted at its lower end to the link $h'$, which is tight on the end of shaft F. The top of post $h$ is also pivoted to one end of a guiding-link $h^2$, pivoted at the other end to a support $h^3$ on the plate $h^4$. The plate $h^4$ extends beneath the link and around the post and is bolted to the top of the lower ice-chest.

When the weighing mechanism is in the normal position, (shown in Figs. 1 and 2,) the valve is in the open position. (Shown in Fig. 3.) The ring $g^2$ is adjusted on the lever G, so that the weight will be in a position to be lifted by a determined weight on the platform H. The receptacle to be filled is placed on the platform H. The spigot $B^4$ is opened, and the beer runs into the receptacle until the weight is sufficient to tilt the lever G. As the lever G swings toward a horizontal position the valve C is gradually moved toward its closed position, and when the lever is tilted so that its outer end is just above the level of the shaft the weight $g^3$ quickly slides down toward the shaft until roller $g^5$ strikes stop $g$, quickly closing the valve C. (See Fig. 4.) There being now no pressure behind the beer in the upper coil $B'$ the flow from spigot $B^4$ is cut off. The spigot $B^4$ is now closed, the filtered receptacle is lifted off the platform H, and the weight slides back to its initial position, returning all the parts to their normal positions and opening the valve C.

It will be observed that the valve C is entirely independent of spigot $B^4$ and that no adjustment of spigot $B^4$ is necessary preparatory to running off the beer or other liquid. The spigot is always ready for use and operates at once in the ordinary way and continues to so operate until a predetermined quantity is run off. The valve is admirably adapted to the special purpose for which it is designed and is closed first slowly to balance the scales and then quickly as soon as the scales are very slightly overbalanced.

The precise details of construction shown need not of course be adhered to, and we do not restrict ourselves to such details except wherein we particularly claim them.

The measuring of beer by weight instead of by volume is advantageous by reason of the specific gravity of beer varying greatly with variations of pressure.

Having now fully described our invention, what we claim, and desire to protect by Letters Patent, is—

1. In an automatic weighing and cut-off apparatus for liquids, the combination, with the manually-controlled spigot, of a separate and independent valve, a pipe connection from the valve to the spigot, and a scale connected with the valve adapted to receive a vessel and normally holding the valve open but adapted to be moved to close said valve when the weight of the vessel plus the weight of the entering liquid exceeds a predetermined amount.

2. In an automatic weighing and cut-off apparatus for liquids, the combination, with the manually-controlled spigot, of a separate and independent valve, a pipe connection from the valve to the spigot, a scale connected with the valve and comprising a platform underneath the spigot for holding the vessel to be filled and a weighted lever normally upholding the platform and holding the valve open but adapted to be moved to close said valve when the weight of the vessel plus the weight of the entering liquid exceeds a predetermined amount.

3. In an automatic weighing and cut-off apparatus for liquids, the combination, with the manually-controlled spigot, of a separate valve, a pipe connection from the spigot to the valve, a platform, a post, a shaft connected with the valve a link connecting the post and the shaft, a downwardly-extending lever connected to the shaft, a balance-weight slidable upon said lever and normally operating through said shaft to hold said valve in its open position and said platform in its elevated position, the valve being closed and the lever tilted upwardly by the depression of said platform, permitting the weight to slide on said lever toward the shaft.

4. The combination with the lower and upper ice-chests, of a coil of pipe in each chest, a pipe connection from the one coil to the other, a valve interposed in said pipe connection and in the lower chest, a spigot on the exterior of the upper chest and connected with the coil therein, a scale for holding the vessel to be filled located beneath said spigot and connected with said valve and normally acting to hold said valve in its open position and adapted to be moved to close said valve when a predetermined weight of liquid has entered said vessel.

5. In an automatic weighing and cut-off apparatus, the combination with the manually-controlled spigot, of a separate valve, a pipe connection from the source of supply to the spigot, the valve being interposed in said connection, a shaft for actuating said valve, a lever secured to said shaft, a weight slidable on said lever and normally holding said valve open, a platform connected with said shaft and adapted to be depressed when gradually loaded to tilt said shaft and weighted lever, and move said valve toward its closed position until said lever is tilted to permit the weight to slide and suddenly close the valve.

6. The valve C, comprising the member $c$, the stem $c^2$, the inclosure $c^3$, and the coiled spring $c^6$, in combination with the valve-casing, and a valve-stem having its bearing in said casing, a shaft connected with a scale, and a pipe connection communicating with both sides of said casing, the said pipe connection being in constant communication with one side of the valve-chamber, its communication with the other side of said valve-chamber being shut off by the shifting of the valve.

7. In an automatic weighing and cut-off apparatus for liquids, the combination, with the normally-controlled spigot, of a separate and independent valve, a pipe connection from the valve to the spigot, a platform underneath the spigot for holding the vessel to be filled, a shaft F connected with said valve and said platform, a lever G connected with said shaft, a weight $g^3$ slidable upon said lever and normally holding the shaft turned to uphold the platform and hold the valve open, the shaft being turned to close the valve and tilt the lever upwardly by the depression of the platform when the weight of the vessel plus the weight of the entering liquid exceeds a predetermined amount, and permitting the weight to slide on said lever toward the shaft.

In testimony of which invention we have hereunto set our hands, at Philadelphia, Pennsylvania, on this 23d day of June, 1899.

ALFRED T. WILKINS.
DANIEL DEVER.

Witnesses:
M. F. ELLIS,
J. M. SHINDLER, Jr.